United States Patent
Giannotta

(10) Patent No.: US 11,451,113 B2
(45) Date of Patent: Sep. 20, 2022

(54) ELECTRICAL POWER GENERATING APPARATUS

(71) Applicant: Eugene A. Giannotta, Naples, FL (US)

(72) Inventor: Eugene A. Giannotta, Naples, FL (US)

(*) Notice: Subject to any disclaimer, the term of this patent is extended or adjusted under 35 U.S.C. 154(b) by 0 days.

(21) Appl. No.: 16/446,693

(22) Filed: Jun. 20, 2019

(65) Prior Publication Data

US 2020/0403485 A1    Dec. 24, 2020

(51) Int. Cl.
  *H02K 7/18*     (2006.01)
  *F03G 7/08*     (2006.01)
  *E01C 1/00*     (2006.01)
  *H02K 7/075*    (2006.01)
  *E01C 11/00*    (2006.01)
  *F16H 21/22*    (2006.01)

(52) U.S. Cl.
  CPC ............ *H02K 7/1853* (2013.01); *E01C 1/00* (2013.01); *E01C 11/00* (2013.01); *F03G 7/08* (2013.01); *H02K 7/075* (2013.01); *F16H 21/22* (2013.01)

(58) Field of Classification Search
  CPC ........ H02K 7/1853; H02K 7/075; F03G 7/08
  See application file for complete search history.

(56) References Cited

U.S. PATENT DOCUMENTS

| | | | |
|---|---|---|---|
| 4,239,975 A * | 12/1980 | Chiappetti | F03G 7/08 290/1 R |
| 4,614,875 A * | 9/1986 | McGee | H02K 7/1853 290/1 C |
| 6,204,568 B1 * | 3/2001 | Runner | F03G 7/08 290/1 R |
| 6,376,925 B1 * | 4/2002 | Galich | F03G 7/08 290/1 R |
| 6,949,840 B2 * | 9/2005 | Ricketts | F03G 7/08 290/1 A |
| 7,432,607 B2 * | 10/2008 | Kim | F03G 7/08 290/1 R |
| 7,589,427 B2 * | 9/2009 | Davis | F03G 7/08 290/1 R |
| 7,714,456 B1 * | 5/2010 | Daya | F03G 7/08 290/1 R |
| 8,330,283 B2 * | 12/2012 | Lin | H02K 35/02 290/1 R |
| 8,754,539 B2 * | 6/2014 | Black | F04B 35/00 290/1 R |

(Continued)

*Primary Examiner* — Sean Gugger
(74) *Attorney, Agent, or Firm* — Sue C. Watson; Southern Plains IP Law PLLC

(57) ABSTRACT

An electrical power generating apparatus with one or more platforms, securely positioned on a surface, for example, highways are disclosed. The platform is comprised of one or more cavities, configured to receive push force to rotating force conversion systems and one or more generators. The platform further comprises a plurality of protrusions, configured to move upward and downward via a reset member via a plurality of apertures on a top portion of the platform. At least one protrusion is connected to the push force to rotating force conversion system. The generators are coupled to a shaft that is rotated by the push force to rotation force conversion system and configured to generate electrical power when an external force is applied on at least any one of a protrusion by a moving object. The generated electric power is transferred to an electric power grid and electric storage devices using conductors.

20 Claims, 13 Drawing Sheets

(56) References Cited

U.S. PATENT DOCUMENTS

| | | | | |
|---|---|---|---|---|
| 8,928,160 | B2* | 1/2015 | Jang | F03G 7/08 290/1 R |
| 2002/0089309 | A1* | 7/2002 | Kenney | H02K 7/1853 322/1 |
| 2004/0160058 | A1* | 8/2004 | Gott | F03G 7/08 290/1 R |
| 2005/0089370 | A1* | 4/2005 | Painchaud | F03G 7/08 404/71 |
| 2007/0013244 | A1* | 1/2007 | Kinkaid | F03G 7/08 310/75 C |
| 2007/0264081 | A1* | 11/2007 | Chiu | E01C 9/007 404/71 |
| 2010/0006362 | A1* | 1/2010 | Armstrong | F03G 7/08 180/165 |
| 2011/0148121 | A1* | 6/2011 | Kenney | F03G 7/08 290/1 R |
| 2011/0187125 | A1* | 8/2011 | Jang | F03B 13/00 290/1 C |
| 2011/0215593 | A1* | 9/2011 | Chang | F03G 7/08 290/1 R |
| 2012/0321383 | A1* | 12/2012 | Sieger | E01C 9/00 404/71 |
| 2013/0334826 | A1* | 12/2013 | Tort-Ortiz | H02K 7/1853 290/1 C |
| 2015/0084344 | A1* | 3/2015 | Turner | H02K 7/1853 290/1 D |
| 2015/0361967 | A1* | 12/2015 | Gallelli | F03B 1/02 60/530 |
| 2016/0230784 | A1* | 8/2016 | Shani | F03G 7/08 |
| 2016/0233755 | A1* | 8/2016 | Bayrakdar | H02K 41/06 |
| 2017/0292499 | A1* | 10/2017 | Sia | F03D 15/10 |
| 2018/0266061 | A1* | 9/2018 | Wu | F03G 7/08 |

* cited by examiner

ELECTRICAL POWER GENERATING APPARATUS

BACKGROUND OF THE INVENTION

A. Technical Field

The present invention generally relates to an electrical power generating apparatus. Specifically, the present invention relates to an electrical power generating apparatus configured to generate electrical current from the weight of moving and/or stopped objects, for example, vehicles.

B. Description of Related Art

Energy demand across the world has increased rapidly in recent decades with economic growth and the spread of industrialization in developing countries. Currently, there are many different types of electric power generating plants operating to produce power from renewable and non-renewable energy sources to meet the world's energy needs. Power generation broadly comes from sources such as coal, nuclear, natural gas, hydroelectric, wind, oil, solar, geothermal sources, etc. Power generation from oil, coal, and similar sources typically leads to pollution and is thought to contribute to global warming. Power generation from nuclear raises safety and security concerns.

Additionally, much of the electricity generated from more recently installed renewable energy sources has been significantly more expensive than non-renewable resources and has its own unintended environmental consequences. Some examples of unintended environmental consequences are that wind turbines kill large numbers of birds every year, ground-based solar power systems consume large swaths of land, and solar panels are manufactured with hazardous materials. There is a significant need to generate electrical power from other cost-effective sources to meet the world's energy needs without causing pollution or unintended environmental consequences.

A prior art, US20110298222 of Bailey et al., discloses a system of embedded cylindrical rollers mounted in an underground containment system in spaced transverse channels beneath a road surface. Power is generated from the passage of motor vehicles over the rollers converting rotary energy into electrical energy. Each roller is designed as a power generator which can be networked together to produce electrical energy directly to a storage battery or grid, thereby eliminating the need to couple the roller to an external generator as in prior art. The system activates when the vehicles contact the embedded rollers in a prescribed direction and transfer vehicular movement into rotational motion, thus generating electrical energy produced in-situ without the need for an external generator.

Another prior art, U.S. Pat. No. 7,102,244 of John P. Hunter, Jr., discloses an electrical generating system. The system includes a plurality of generating modules in the form of long narrow strips are embedded in the expansion joints of concrete roadways across traffic lanes. The system further includes a linear multi-coil, multi-magnet magneto generator. Cam elements are used to momentarily engage the tires of moving vehicles so as to mechanically move a shaft that is part of the linear multi-coil, multi-magnet magneto generator embedded below grade. After the vehicle tire moves off the cam element, it is returned to its original position by a spring which had been compressed by the force of the vehicle tire. In this manner, pulses of electricity are generated on both up and down strokes of the linear magneto generator. However, these systems and methods are of complex designs and are not economical or efficient for generating electrical power.

There is a need for a power generating apparatus to efficiently and cost effectively generate electrical power from the weight of moving objects, for example, vehicles, with negligible environmental impact and negligible impact to existing object/vehicle motion. There is also a need for a power generating apparatus simply installed on the surfaces, for example, highways and roadways without excavating the surfaces. There is also a need for a power generating apparatus to prevent snow and ice accumulation on the surfaces where it is placed in regions where snow and ice occur; and as a result, the apparatus also significantly reduces damages to roadways, highways, and bridges that would otherwise be ruined by snow and ice removal via snow plows, road salts, and other de-icing chemicals. There is also a need for a power generating apparatus to protect the surface or layer on which it is placed. This apparatus will extend the life span of surfaces, for example, highways; which means their maintenance and replacement costs are significantly deferred. An additional benefit of this invention is that any pre-damaged surfaces, such as but not limited to; surfaces with pot holes and/or significant cracks, the vehicles or objects will no longer encounter the damaged surfaces but will instead move along a level solid surface and thus encounter a much smoother and safer experience.

SUMMARY OF THE INVENTION

The present invention generally discloses an electrical power generating apparatus. The present invention is directed to an electrical power generating platform/apparatus configured to generate electrical power from the weight of moving and/or stopped objects, for example, vehicles.

In one embodiment, an electrical power generating apparatus comprises one or more platforms. The term 'platform' comprises a platform and/or one or more components used to achieve the basic function(s) and/or functionality of a platform, including but not limited to, the functions described in this document. In one embodiment, one or more platforms are positioned on a surface. The platform is a protective platform. In one embodiment, the surface includes anywhere people or vehicles traverse, including but not limited to, streets, highways, on-ramps, off-ramps, and roads. In one embodiment, the conductor wire contents of platforms could be connected to each other to form a closed circuit or circuits. In one embodiment, the platforms can also be physically connected to each other to facilitate the smooth transition of objects from one platform to the next. In one embodiment, each platform includes one or more cavities. The cavities can contain inner pillars or walls. The cavities are configured to receive one or more generators and one or more overhead push force to rotation force conversion systems. In one embodiment, the platform includes sloped/inclined/declined surfaces around any or all the exterior outside portions of the platforms. The sloped/inclined/declined surfaces around the exterior outside portions enable smooth traveling of the objects, for example, vehicles on and off the platforms. Each platform further includes a plurality of apertures and protrusions on a top portion of the platform.

The top cover of the system comprises a plurality of apertures providing channels or openings into, out of, and through the top of the platform. Through these apertures move protrusions that are initially raised up above the top of the platform. When downward force is applied to these protrusions by an object, that force is harnessed and transmitted to rotate the components of generators inside the platform to create electric current. There are numerous ways to harness and transmit this downward force to rotate the components of the generators inside the platform. For example, in one embodiment, the protrusions are bars/shafts/bumps/bulges/buttons/knobs/switches/handles/pistons/fixtures which fit inside and through the apertures. Multiple protrusions can be connected together via a connector and connected to a primary protrusion. The plurality of protrusions is configured to move upward and downward via a reset member and through a plurality of apertures on a top portion of the platform. In one embodiment, at least one protrusion or a primary protrusion is a longer vertical bar/shaft/fixture/piston and it connects to a slightly downward angled second bar/shaft/fixture/piston beneath it. The said downward angled second bar/shaft/fixture/piston is also connected to at least a single one-way bearing, such as, but not limited to, sprag bearings. In one embodiment, the inner ring/sphere of the one-way bearings is affixed to a subsequent horizontal shaft that can rotate, and onto the said horizontal shaft that can rotate are also affixed the magnets or insulated conductor components of one or more generators, thereby generating electric power by rotating the components of one or more generators coupled to a shaft via the push force to rotation force conversion system when an external force is applied on at least one protrusion by a moving object. When said horizontal shaft or shafts rotate, then either the magnets, or insulated conductors, or both the magnets and insulated conductors of the generators also rotate, and electric current is generated. That electric current that is generated is transferred to an electric power grid, or power storage unit(s), using one or more adequate conductors. In a preferred embodiment, the conductor(s) that transfer/transport current outside the platforms to the electric power grid or the power storage unit(s) are enclosed inside insulated and water proof materials/conduits. In one embodiment, the plurality of protrusions which move freely inside and through the apertures are further configured to return to their normal/initial/start positions via a reset member associated with one or more protrusions, after the object or vehicle has passed over/onto the protrusions and depressed/moved the protrusions. In one embodiment, the reset member is an elastic member. In another embodiment, the reset member is comprised of a spring or springs. In another embodiment, the reset member is comprised of repelling magnets. In another embodiment, the reset member is a compression device and/or comprised of fluids and/or gases that compress when force is applied, and decompress when the force has passed.

In one embodiment, there are one or more generators securely positioned inside one or more cavities of the platform. In one embodiment, the generators are electrically connected to each other to form an individual closed circuit or more than one closed circuit. In one embodiment, the components of multiple generators are securely connected to a shaft that rotates. In this embodiment, multiple generators are configured to generate electrical power from the rotation of the same shaft. In one embodiment, the generators and shafts are arranged in any one of a row or column configuration inside the platform to maximize the holding capacity of the platform/apparatus. In some embodiments, the generators and shafts are arranged in any combination of a row and column configuration inside the platform to maximize the holding capacity of the platform/apparatus. In one embodiment, the platforms comprise one level of generators, which are securely positioned inside the platforms. In another embodiment, the platforms comprise multiple-levels/layers of generators, which are securely positioned inside the platforms. In a preferred embodiment, the rotating shafts with a plurality of generators are arranged within the platform in the row configuration. In one embodiment, individual generators are not connected to a shaft. In another embodiment, one or more generators may be affixed to a shaft and one or more generators may not be affixed to a shaft. In one embodiment, the generators are fastened or adhered to a portion or portions of the platforms to keep them stable inside the platforms. In a preferred embodiment, the generators are raised up above the floor inside the platforms. In another embodiment, the generators are placed on the floor inside the platforms.

The push force to rotation force conversion system is configured to convert the moving weight of objects on top of the platform to perform the work of rotating electric current producing generators inside the platform, and that process begins with the depression/movement of protrusions above the top of the platforms through apertures in the top of the platform. In one embodiment, more than one protrusion is connected together to a primary protrusion; so that when an object depresses/moves anyone of those connected protrusions, the primary protrusion is depressed/pushed/moved, and that push force is converted to rotation force via a conversion system. In another embodiment, individual protrusions are not connected to other protrusions, and individual protrusions are instead directly connected to one or more push force to rotation force conversion systems. The rotation force rotates either the components of individual generators, or rotates at least one shaft onto which the components of at least one generator are affixed and thus also rotate, or rotates a combination of the components of individual generators and individual shafts. The plurality of generators inside the platform is directly or indirectly connected to the electric power grid or power storage unit(s) via one or more adequate conductors In one embodiment, at least either the magnets and/or insulated conductors of the generator are affixed to at least one bearing, bushing, sleeve, roller(s), or combination thereof. In another embodiment, at least one shaft is affixed to at least one bearing, bushing, sleeve, roller(s), or combination thereof. In one embodiment, the bearings/bushings/sleeves/rollers are components of the generators. In one embodiment, the bearings/bushings/sleeves/rollers are components of the conversion system that converts downward push force to rotation force. In one embodiment, the platform further comprises a protective cover. In one embodiment, the protective cover is removable. In one embodiment, the protective cover is configured to protect the platform's internal systems, such as but not limited to, the generators and their components, the internal conductors, the shafts, the internal push force to rotation force conversion systems, and other components inside the platform. In one embodiment, the exterior of the top protective cover of the platform is comprised of a non-slip surface. In one embodiment, the protective cover is positioned on and/or over the platform and sealed to keep moisture outside of the platform.

In one embodiment, the protective cover is provided with one or more resistive conductors that can be activated to melt ice and/or snow to prevent ice and/or snow from accumulating on the platform. In one embodiment, the resistive conductors are affixed or integrated to, but not limited to, a top portion of the protective cover. In some embodiments, the resistive conductors are affixed or integrated to, but not limited to, an underside of the top protective cover of the platform. In one embodiment, the resistive conductors heat up upon the flow of electric current to melt the snow and/or ice that would otherwise accumulate on the platform. In another embodiment, the resistive conductors are affixed to the top portion of the protective cover and embedded within the protective cover.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The embodiments herein will be better understood from the following detailed descriptions with reference to the drawings, in which.

DETAILED DESCRIPTION OF EMBODIMENTS

A description of embodiments of the present invention will now be given with reference to the figures/drawings. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
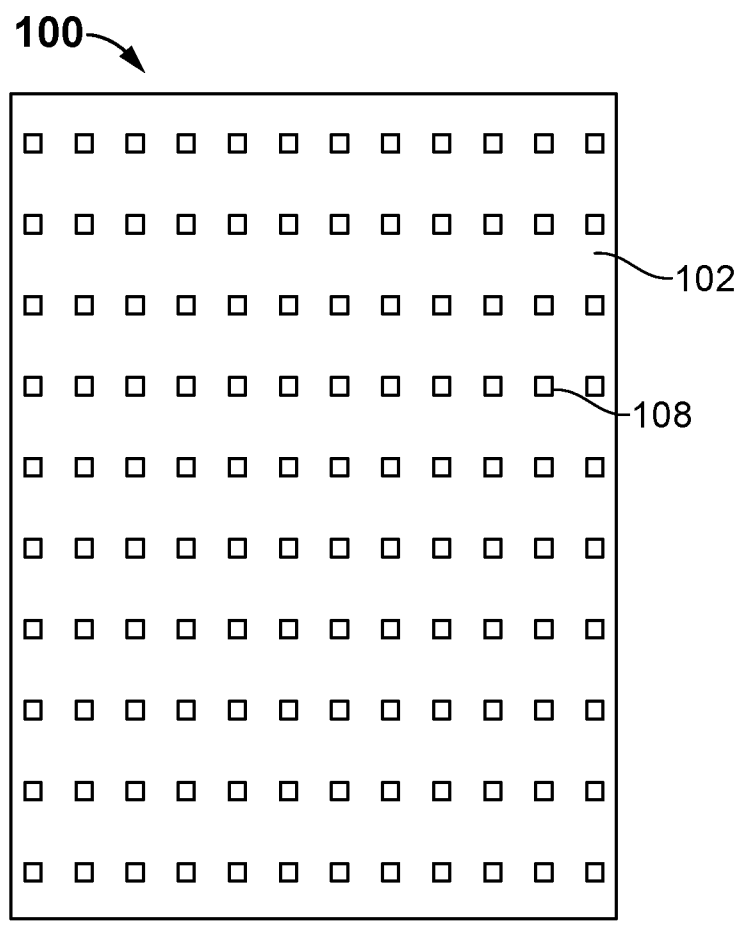
FIG. 1 shows an overhead view of a platform of an electric power generating apparatus with apertures in the top cover of the platform, in one embodiment of the present invention.

Referring to FIG. 1, an overhead view of a top portion of the platform cover 102 of an electrical power generating apparatus/platform 100 is disclosed. In one embodiment, the apparatus includes one or more platforms 100. A platform is to be securely positioned on a top surface and/or affixed to surfaces, wherever moving objects, vehicles or vehicle attachments could travel/traverse/move/stop. In one embodiment, the surface includes, but is not limited to, one or more locations where wheeled vehicles traverse, including but not limited to entrance and exit areas of parking areas/lots, drive-throughs, streets, roads, avenues, paths, highways, expressways, freeways, thruways, bridges, tunnels, toll areas, interstates, superhighways, turnpikes, arteries, parkways, on-ramps, off-ramps, tunnels, bridges, tracks, sidewalks, walkways, paths, trails, and floors. In one embodiment, the platforms 100 could be physically connected to each other to facilitate the smooth transfer of objects and/or wheeled vehicles along the tops of the platforms. In one embodiment, the electrical contents/components, for example, generators 106 (shown in FIG. 3) of the platforms 100 could be connected to each other using one or more conductors. In one embodiment, each platform 100 is comprised of a plurality of small generators 108. The platform cover 102 is comprised of a non-slip surface. The top of the platform contains apertures 108 and within/through these apertures move protrusions that are initially raised up above the top of the platform. In one embodiment, the color of the top of the platform is a color that reflects wavelengths of sunlight, in order to reflect heat away from the platform 100 and the inside of the platform 100. This can be an important cooling solution in areas with abundant sunshine. In one embodiment, the color or coatings or materials used for the top of the platform 100, or other exterior sections of the platform, could either absorb, or reflect, wavelengths of sunlight, or both, in order to heat or cool the platform 100. In one embodiment, the ventilation apertures are included in the platform(s) 100 to allow air to flow into and/or outside of the platform 100. In one embodiment, the platform 100 is insulated. Platforms 100 can be of virtually any length, width, shape or size.

In one embodiment, the electrical contents/components of the platforms 100 could be securely and electrically connected to each other using one or more conductors. In one embodiment, an insulated and/or waterproofed electrical conductor or conductors is/are used to connect the electrical components/contents, for example, generators 106 of the individual platform 100 with the electrical power grid and/or power storage unit(s), and/or to connect the components/contents of the platform(s) 100 with the electrical power grid, and/or connect the power grid or other power sources to components, for example, resistive conductors 146 (shown in FIG. 15) of the platform 100. In one embodiment, one or more insulated electrical conductor(s) enclosed inside insulated and water proof materials/conduits will be used to supply or transport electricity to the power grid or power storage unit(s). In one embodiment, the electric current generated by one platform 100 which houses generators 106 is combined via insulated and/or waterproofed electrical conductor(s) with the electric current generated by one or more additional platforms 100 housing generators 106 to transfer the generated electrical current to a power grid or other electric storage devices. In one embodiment, when electric current generated by one platform 100 exits the platform 100 and adequate conductor(s) are used to transport the electric current to the power grid or power storage unit(s), at least one diode is installed before and/or after exiting the platform 100, that allows the current to flow into the adequate transportation conductor(s), while resisting/preventing the current from flowing back into the platform 100. In one embodiment, the entire platform 100 has a height above the surface of about, but not limited to, approximately 5 inches. In one embodiment, a plurality of apertures or conduits 108 is provided on a top portion of the platform cover 102 of each platform 100. In one embodiment, each aperture or conduit 108 of each platform 100 prevents rain and/or snow from entering into the platform 100 and damaging the electrical components inside the platform 100. In one embodiment, each platform 100 is electrically grounded and/or uses ground fault circuit interrupter(s) to protect the electric power generating apparatus and people from harm while operating safely. In one embodiment, the platforms 100 are made of, but not limited to, rustproof materials, and/or coated/sealed/protected with material(s) to shield the platform 100 from rusting or corrosion, and/or environmental wear and tear. In a preferred embodiment, the protrusions 110 could fit closely/snugly inside/within the area of the apertures 108 and fill the area of the apertures 108 so that very little moisture, or any moisture, or other environmental elements can seep inside the platform 100 through the apertures 108. In one embodiment, one or more apertures 108 enter and exit the top of the platform 100, while one or more apertures 108 are partial apertures.

Figure 2A:
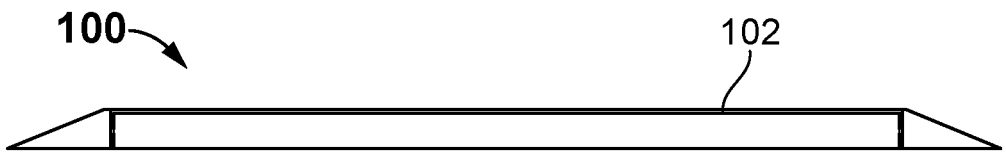
FIG. 2A shows a side view of the platform of the electric power generating apparatus which includes sloped/inclined/declined surfaces around the exterior outside portions in one embodiment of the present invention.
Figure 2B:
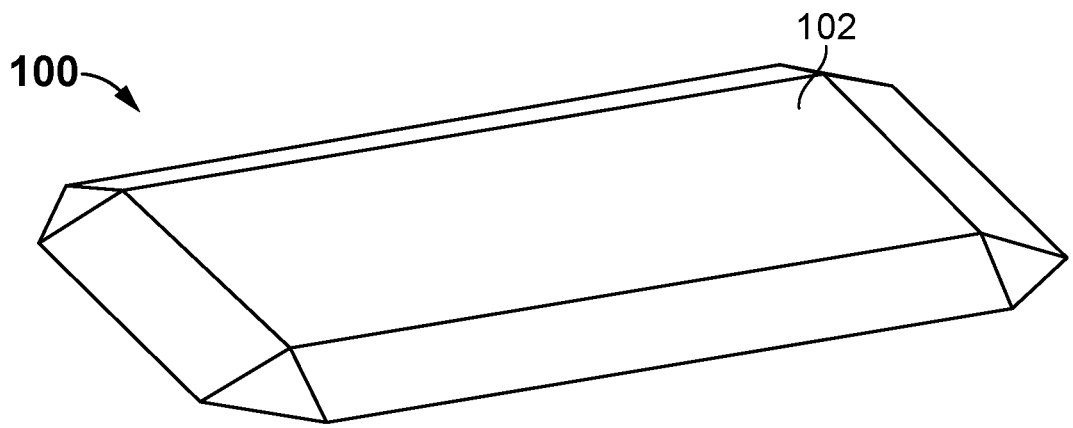
FIG. 2B shows a perspective view of the platform of the electric power generating apparatus which includes sloped/inclined/declined surfaces around the outside portions in one embodiment of the present invention.

Referring to FIGS. 2A-2B, the platform 100 includes sloped/inclined/declined surfaces around the exterior outside/side portions is disclosed. The sloped/inclined/declined surfaces can be located around any exterior outside/side portions enabling smooth traveling of vehicles 116 (shown in FIG. 16) on and off the platforms 100. In one embodiment, the inclined/sloped/declined surfaces bridge the top portion of the platform cover 102 of the platforms 100 with the surface on which they are placed. In another embodiment, if the platforms 100 are positioned in very close proximity to other platforms 100, then those sides of the platform 100 that are in close proximity do not require sloped/inclined/declined surfaces around the exterior side portions and neither do they require additional connector surfaces. In some embodiments, the platform 100 surfaces are connected by connectors to facilitate the smooth transition of objects from the top of one platform to the next. In some embodiments, the platforms 100 do not have any sloped/inclined/declined surfaces around the exterior outside portions. In some embodiments, only a specific exterior outside/side portion, or portions of the platforms 100 have inclined/sloping/declined surfaces. In one embodiment, the platforms 100 include one or more cavities/open areas. The cavity or cavities is/are configured to receive one or more generators 106, shafts, push force to rotation force conversion systems 104 and so forth. The top portion of the platform cover 102 of the platform 100 further includes a plurality of apertures 108 (shown in FIG. 1). In one embodiment, the platforms 100 are made of durable materials to safely support the weight of passing objects or vehicles 116. In one embodiment, the vehicle 116 is at least an object that moves with the aid of a rotating tire or tires, such as but not limited to cars, trucks, buses, semi-trucks, semi-trucks with trailer, tractor trailers, trailers, RVs, SUVs, campers, limousines, cabs, vans, or any other means in or by which someone travels or something is carried or conveyed or transported or any attachments to the vehicles.

Figure 3:
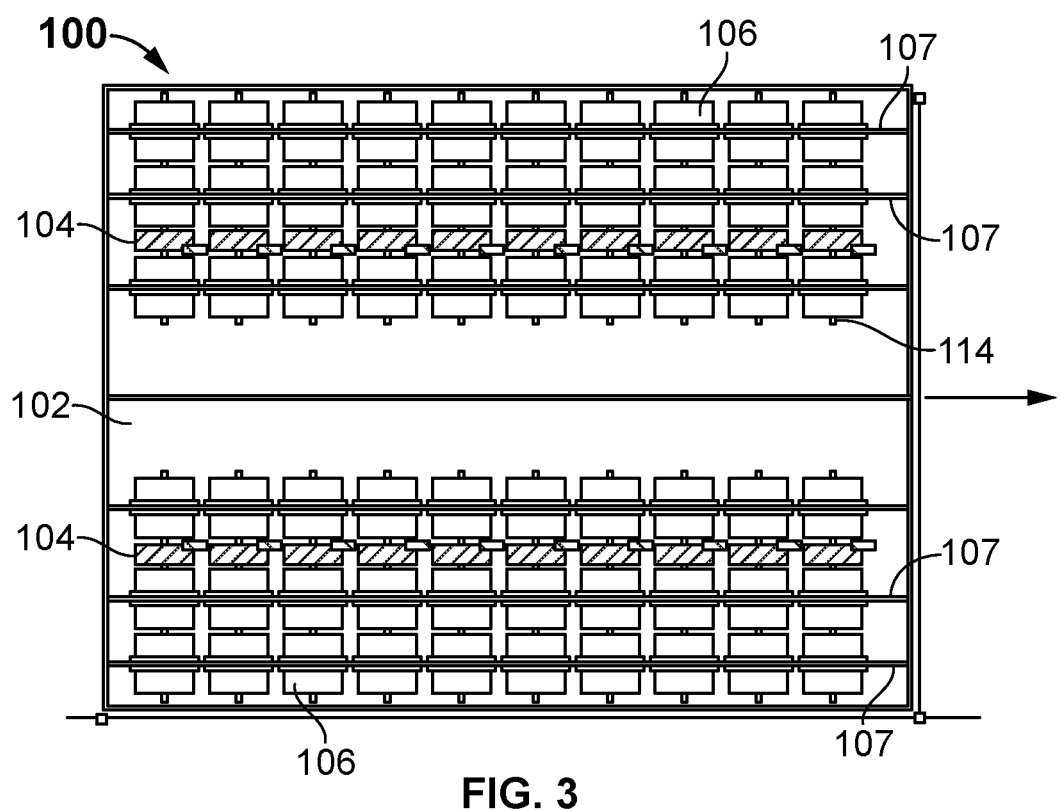
FIG. 3 shows an inside overhead cutaway view of the inside of a platform with its cavities/open areas and with one or more rotating shafts and push force to rotation force systems and a plurality of generators, in one embodiment of the present invention.

Referring to FIG. 3, the plurality of generators 106 are securely positioned inside the cavity or cavities of the platform 100 is disclosed. In one embodiment, the generators 106 are electrically connected to each other to form a closed circuit or circuits. In another embodiment, the generators 106 are not connected to each other. In one embodiment, rows or columns of generators 106 are securely connected to a shaft 114 that rotates the contents of multiple generators 106. In another embodiment, the contents of individual generators 106 are rotated with or without rotation of a shaft. In one embodiment, one or more fan blades are affixed to a shaft or shafts 114 and/or other components inside the platform 100 to circulate air inside the platform 100. The generators 106 are configured to generate electrical power via the push force to rotation force conversion system or systems 104. In one embodiment, the one or more push force to rotation force conversion systems 104 with the generators 106 are arranged in any one of, or combination of, row or column configuration in the platform 100 to maximize the holding capacity of the platform 100. In one embodiment, the platforms 100 comprise one level of generators 106, which are securely positioned inside the platforms 100. In another embodiment, the platforms 100 comprise multiple-levels/layers of generators 106, which are securely positioned inside the platforms 100. In a preferred embodiment, the push force to rotation force conversion systems 104 and the generators 106 are arranged within the platform 100 in the row and/or column configuration. In one embodiment, the generators 106 are fastened or adhered to a portion of a platform or platforms 100 to keep them stable inside the platforms 100. In a preferred embodiment, the generators 106 are raised up off the floor inside the platform 100. In one embodiment, the generators 106 are placed on the floor of the platform 100. In one embodiment, the cavity or cavities of the platform 100 are separated by inner pillars or walls and/or other object(s), and/or other support(s) 107. In one embodiment, the interior side of the platform's exterior walls are covered with water proof material(s) to keep moisture out of the inside of the platforms 100. In another embodiment, the exterior side of the platform's exterior walls are covered with water proof material(s) to keep moisture out of the inside of the platform(s) 100. In another embodiment, a combination of both the interior and exterior side(s) of the platform's exterior walls are covered with water proof material(s) to keep moisture out of the inside of the platform(s) 100. In another embodiment, specific areas inside the platform 100 are covered with water proof material(s) to keep moisture away from contents. In a preferred embodiment, the conductors that transfer the current from inside the platform 100 to outside the platform 100, exit the platform 100 in one general area to limit entry points for exterior water/moisture and/or other environmental elements into the platform 100. In one embodiment, additional covers and/or barriers are installed inside and/or outside the platform(s) 100 to keep moisture and other environmental threats off and/or away from components inside the platform(s) 100.

In a preferred embodiment, the generators 106 of the platform 100 are configured to generate alternating current (AC). In another embodiment, the generators 106 of the platform 100 is/are instead configured to generate direct current (DC). Further, the DC current generated by the platform 100 can be converted into AC current using one or more power inverters before transferring or feeding the electric current to an electric power distributing network, for example, the power grid. In another embodiment, the platform 100 is further configured to generate AC current at one or more particular frequency or frequencies and magnitude from the generators 106. Further, the generated AC current at some initial frequency and/or frequencies and/or magnitude or magnitude(s) is converted to AC current with another frequency and/or another magnitude using a converter or converters.

Figure 4:
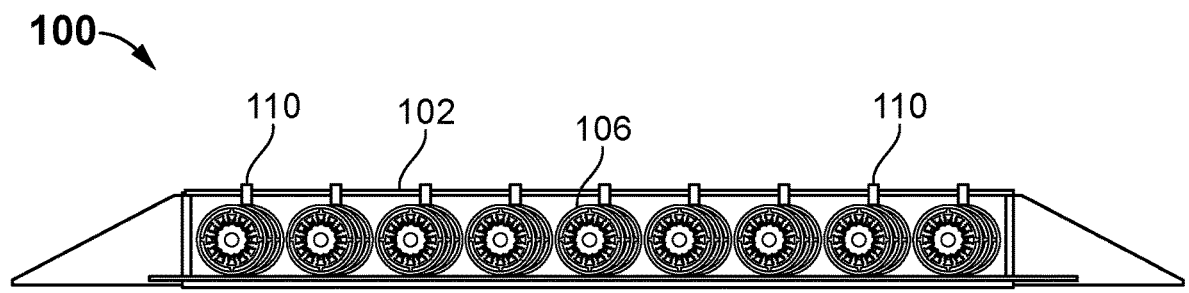
FIG. 4 shows a side cutaway view of the platform which includes a plurality of protrusions with a plurality of generators of the apparatus in one embodiment of the present invention.

Referring to FIG. 4, each platform 100 contains a plurality of protrusions 110 and the depression/movement of any said protrusions activates one or more push force to rotation force conversion system(s) 104 (shown in FIG. 3 and FIG. 5) of the platform 100 is disclosed. The plurality of protrusions 110 is configured to be elevated up above the platform cover 102 through the plurality of apertures 108, and the top of the apertures exits at the top portion of the platform 100. The plurality of protrusions 110 such as, but not limited to, shafts, bumps, bulges, buttons, knobs, switches, handles, pistons, and so forth, or multiple protrusions are raised up above/through the apertures 108 of the platform cover 102. The plurality of protrusions 110 is further configured to be depressed/pushed/moved into the platform 100, thru the top portion of the platform cover 102 of the platforms 100 through the plurality of apertures 108 when the object or vehicle's tires 142 (shown in FIG. 14) passes or rolls or moves over the plurality of protrusions 110 and the top portion of the platform cover 102 of the platform 100.

Figure 5:
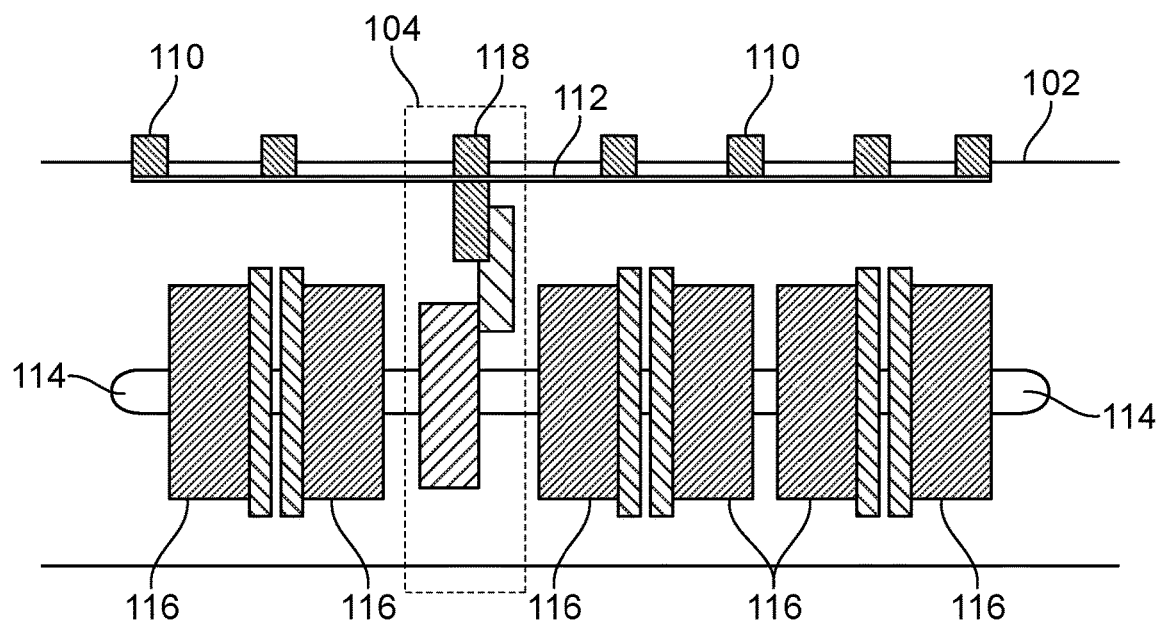
FIG. 5 shows an inside cutaway view of the platform from a front or back side view with a push force to rotation force conversion system, a shaft, a plurality of generators, multiple protrusions connected together to a primary protrusion, in one embodiment of the present invention.

Referring to FIG. 5, the push force to rotation force conversion system 104 of the apparatus 100 with one or more generators 106 (shown in FIGS. 7, 8, 10-14) is disclosed. The push force to rotation force conversion system 104 is configured to rotate a shaft or shafts 114 when an object or vehicle 116 passes over the top portion of the platform cover 102 of the platform 100. A plurality of generators 106 (shown in FIGS. 7, 8, 10-14) can be connected to the shaft 114 and their contents can be simultaneously rotated when the shaft 114 is rotated. In an alternative embodiment, the push force to rotation force conversion system 104 is configured to rotate the contents of one generator 106 with or without the use of a shaft 114. In one embodiment, more than one protrusion 110 is/are connected together via a connecting member 112. When the object or vehicle 116 depresses/moves anyone of those protrusions 110, the push force to rotation force conversion system is activated and a shaft 114 rotates and said shaft also rotates the magnets and/or insulated windings, and/or other contents of generators 106, 132-136, 148-162 (shown in FIGS. 7, 8, 10-14) which are affixed to the shaft 114 in order to generate/produce electrical power. In an alternative embodiment, the individual protrusions 110 are connected to an individual or multiple 'push force to rotation force conversion systems 104. The plurality of generators 106 in the platform(s) 100 are connected to the electric power grid or power storage unit(s) via one or more adequate and insulated and waterproofed conductors. In one embodiment, the generators 106, and the push force to rotation force conversion system 104 are affixed to the shaft 114. In one embodiment, the individual protrusions 110 is/are depressed/moved by the moving object and/or stopped object, for example, a vehicle 116. In one embodiment, pressing/depressing/moving an entire top level of the platform 100 will activate the push force to rotation force conversion system(s) 104. In one embodiment, pressing/depressing/moving a section of the top level of the platform 100 will activate the push force to rotation force conversion system(s) 104. For example, the number of push force to rotation force conversion systems 104 positioned beneath the platform cover 100 is/are activated when the external force is applied on the top level, or a section of the top level, of the platform 100 via the moving and/or stopped objects, for example, vehicles 116.

Figure 6:
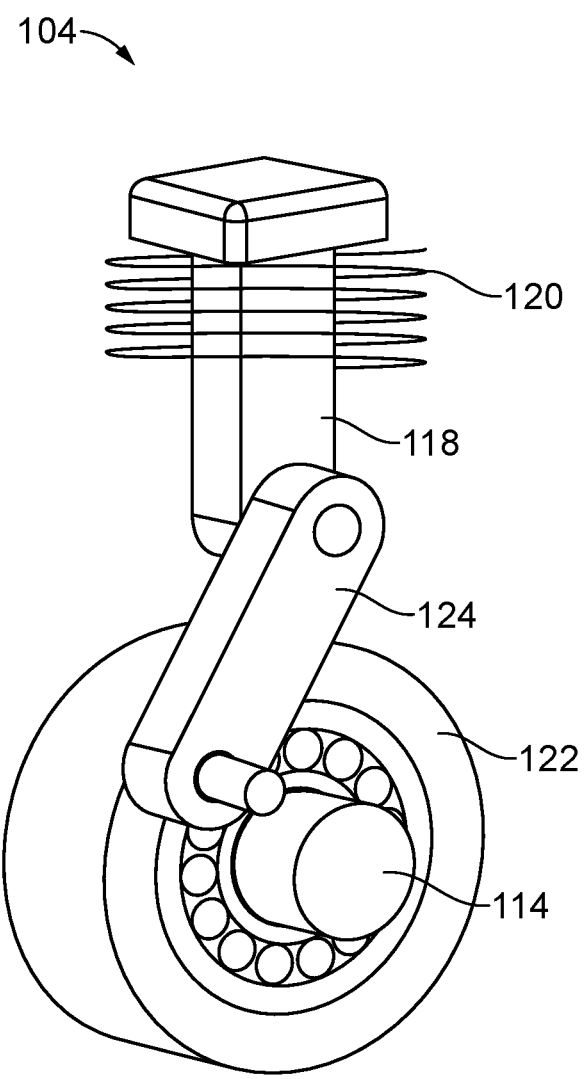
FIG. 6 shows a perspective view of one of many potential versions of a push force to rotation force conversion system and associated shaft in one embodiment of the present invention.

Referring to FIG. 6, one of many possible versions of a push force to rotation force conversion system 104 of the apparatus 100 is disclosed. In one embodiment, the protrusions 110 are an upper section of a bar/shaft/fixture/lever/piston 118 and those bars/shafts/fixtures/levers/pistons 118 move through the apertures 108 (shown in FIG. 1). In one embodiment, more than one protrusion 110 can be connected together via the connecting member 112 to a primary protrusion or primary protrusions 118 (FIG. 5). A primary protrusion 118 can be a longer bar/shaft/fixture/piston that connects to a slightly downward angled second bar/shaft/fixture/piston 124 beneath it. The said downward angled second bar/shaft/fixture/piston 124 is also connected to at least a single one-way bearing, bushing, sleeve, roller(s) 122, such as, but not limited to sprag bearings. The inner ring of those one-way bearings 126 are affixed to the shaft 114 that can rotate, and onto which shaft 114 are also affixed magnets 160 (shown in FIG. 13), and/or insulated conductor coils 132, 150, 154 (shown in FIGS. 7, 8, 11, 12) components of the generators (shown in FIGS. 7, 8, 10-13). When those later shafts, in this embodiment horizontal shafts 114, are in fact rotated, then either the magnets 136, 160, or insulated conductors 132, 150, 154 (shown in FIGS. 7, 8, 11, 12) or both, will also rotate, and generate electric current.

In one embodiment, the push force to rotation force conversion system(s) 104 comprises a plurality of individual protrusions 110 that move freely in the apertures 108. At least one said protrusion 110 is connected to a primary protrusion/bar/shaft/piston/fixture/lever 118 which is configured to return to its normal/initial/start position via a reset member 120 associated with at least the primary protrusion/bar/shaft/fixture/lever/piston. In one embodiment, the reset member 120 is comprised of a spring or springs. In one embodiment, the reset member 120 is an elastic member. In another embodiment, the reset member 120 is comprised of repelling magnets. In another embodiment, the reset member 120 is a compression device and/or comprised of fluids or gases that compress when the force is applied and decompress when the force has passed. In one embodiment, the components of the push force to rotation force conversion system(s) 104 and reset member(s) 120 are made of durable materials that can withstand the weight and force of passing and/or stopped objects and/or vehicles 116.

Figure 7:
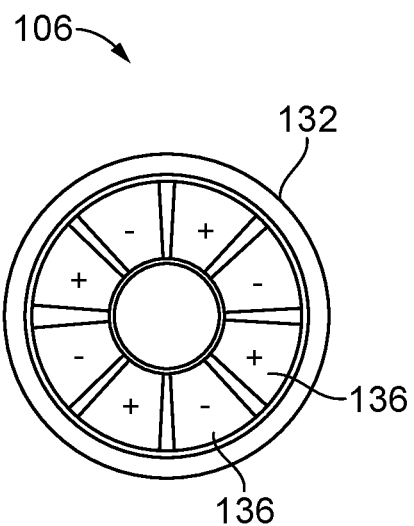
FIG. 7 shows a side cutaway view of one version of a generator used in the electric power generating apparatus in one embodiment of the present invention.

Referring to FIG. 7, the generator 106 of the apparatus 100 is disclosed. In one embodiment, the generator 106 is configured to generate electrical power by rotating the magnets 136 and/or insulated conductor windings 132 of the generator. In one embodiment, the apparatus/platform 100 could use any type of generator that uses magnets 136 and insulated conductor windings 132 for generating electric output power using the apparatus/platform 100. In one embodiment, the generator(s) 106 is/are sized and configured to effectively and efficiently maximize the abilities of the apparatus/platform(s) 100. The generator(s) 106 is/are further configured to connect in any suitable manner based on various design considerations of the platform 100. The generator(s) 106 is/are further configured to generate electric output power by converting the downward pressing energy of an object(s) and/or vehicle's tires 142 into electrical power via the push force to rotation force conversion system(s) 104. The generator 106 is comprised of, but not limited to, insulated conductor coils 132 and magnets 136. In a preferred embodiment, the insulated conductor coils/windings 132 of each generator 106 should be perpendicular or close to perpendicular, to the magnetic fields passing nearby or through them, in order to generate an electric current in the said insulated conductor coils/windings. In one embodiment, the insulated conductor coils 132 are wrapped onto or affixed to, but not limited to, a ferrous material. In some embodiments, the insulated conductor coils 132 are wrapped onto or affixed to at least any one of, but not limited to, a ferrous metal core and/or a steel metal core. In one embodiment, the insulated conductor coils 132 are wrapped onto or affixed to, but not limited to, ferrous containing laminations. In one embodiment, the insulated conductor coils 132 surround the magnets 136. In another embodiment, the magnets 136 surround the insulated conductor coils 132. In one embodiment the magnets 136 of the generator 106 are rotated when a shaft 114 is rotated by the downward push force from the object's and/or vehicle's tires 142 via a push force to rotation force conversion system 104. In one embodiment, the magnets 136 include a plurality of magnetic poles. In one embodiment, the plurality of magnets 136 are arranged in a circle/sphere and positioned in close proximity to the insulated conductor coils 132. In one embodiment, the plurality of magnets 136 is configured to rotate or spin in close proximity to the insulated conductor coils 132, thereby generating electric current within the insulated conductor coils 132 due to a change in the magnetic field. In another embodiment, the insulated conductor coils 132 surround the plurality of magnets 136 of the generator 106. In one embodiment, the generators 106 are fastened/adhered to a portion of the platform 100 to keep them stable inside the platform 100.

In another embodiment, the stationary component of the generator comprises a plurality of magnets 136 and the insulated conductor coils are wrapped around a rotating component. In another embodiment, either the insulated conductor windings or the plurality of magnets 136, could be located on the rotating component or on a stationary component or any combination of both. In another embodiment, in the case of when the stationary component with insulated conductor windings 132 or the plurality of magnets 136, then the stationary component is fastened/adhered to a portion of the platform 100 to keep them stable inside the platform 100.

Figure 8:
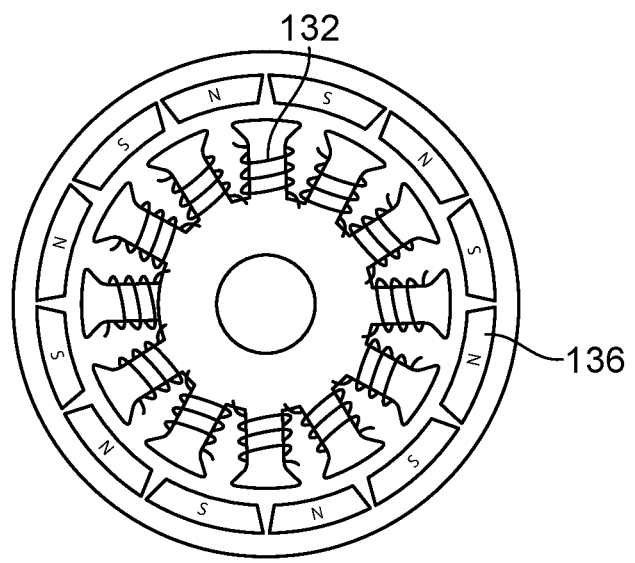
FIG. 8 shows a side cutaway view of one version of a generator used in the electric power generating apparatus in another embodiment of the present invention.
Figure 9:
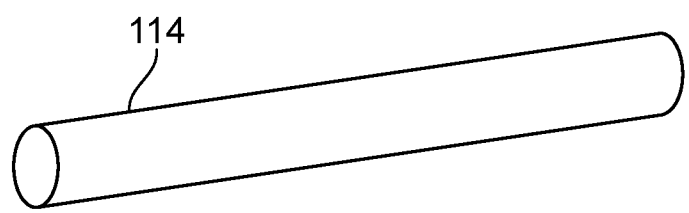
FIG. 9 shows a side view of a shaft that will rotate in order to rotate the components of one or more generators of the electric power generating apparatus in one embodiment of the present invention.
Figure 10:
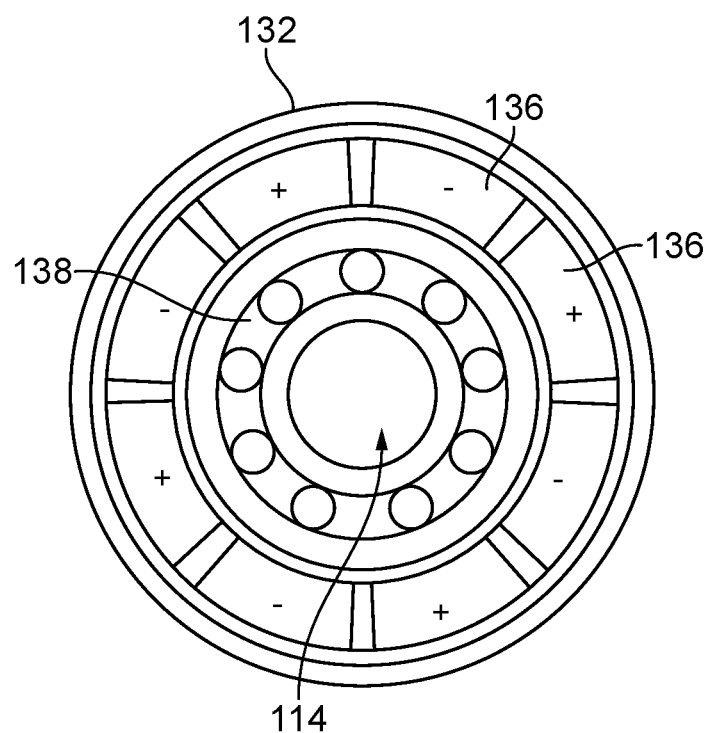
FIG. 10 shows a side view of one version of a generator of the electric power generating apparatus with a plurality of magnets affixed to or on a bearing/bushing/sleeve/roller in one embodiment of the present invention.

Referring to FIG. 8, the plurality of magnets 136 of the generator 106 is surrounded by the insulated conductor coils 132 is disclosed. The plurality of magnets 136 is arranged in a circle/sphere and positioned in close proximity to the insulated conductor coils 132. The plurality of magnets 136, rotates in close proximity to the plurality of insulated conductor coils 132, thereby generating electric current within the insulated conductor coils 132 due to a change/movement in the magnetic field. Referring to FIG. 9, the shaft 114 that can be rotated by the push force to rotation force conversion systems 104 is disclosed. Referring to FIG. 10, the plurality of magnets 136 of the generator 106 is circularly affixed to a bearing 138 is disclosed. In one embodiment, the plurality of magnets 136 is securely affixed to the bearing 138 (shown in FIG. 10). The bearing 138 is configured to securely receive a main shaft 114 that will be rotated. In one embodiment, a bearing 138 is further configured to rotate the rotating component of the generator 106 with the plurality of magnets 136.

Figure 11:
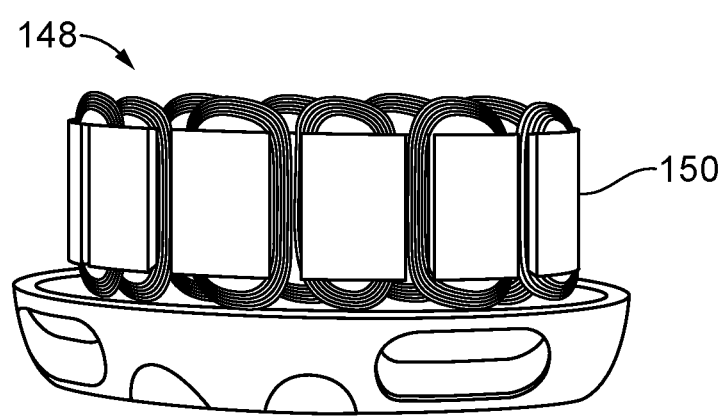
FIG. 11 shows a side view of a stator component of another version of a generator with a plurality of conductive windings or coils of the electric power generating apparatus in another embodiment of the present invention.
Figure 12:
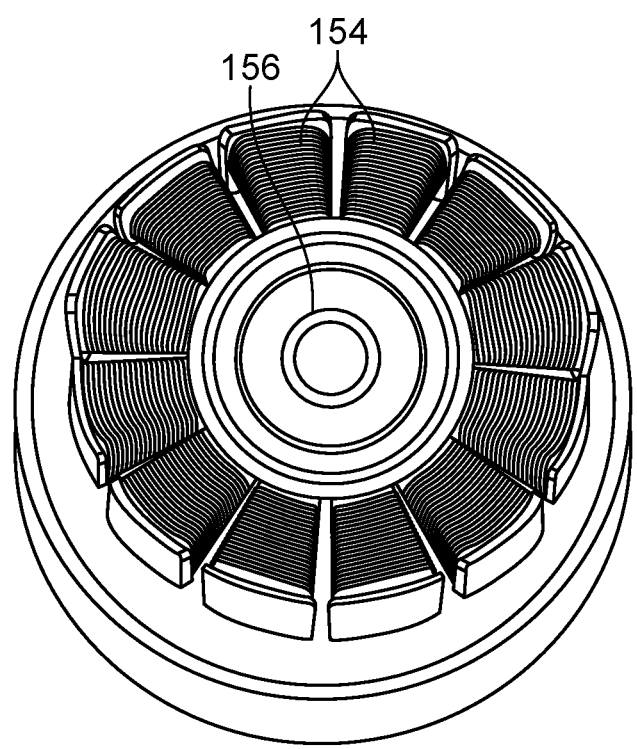
FIG. 12 shows a top view of the stator component of the generator shown in FIG. 11 with a plurality of conductive windings or coils of the electric power generating apparatus in another embodiment of the present invention.
Figure 13:
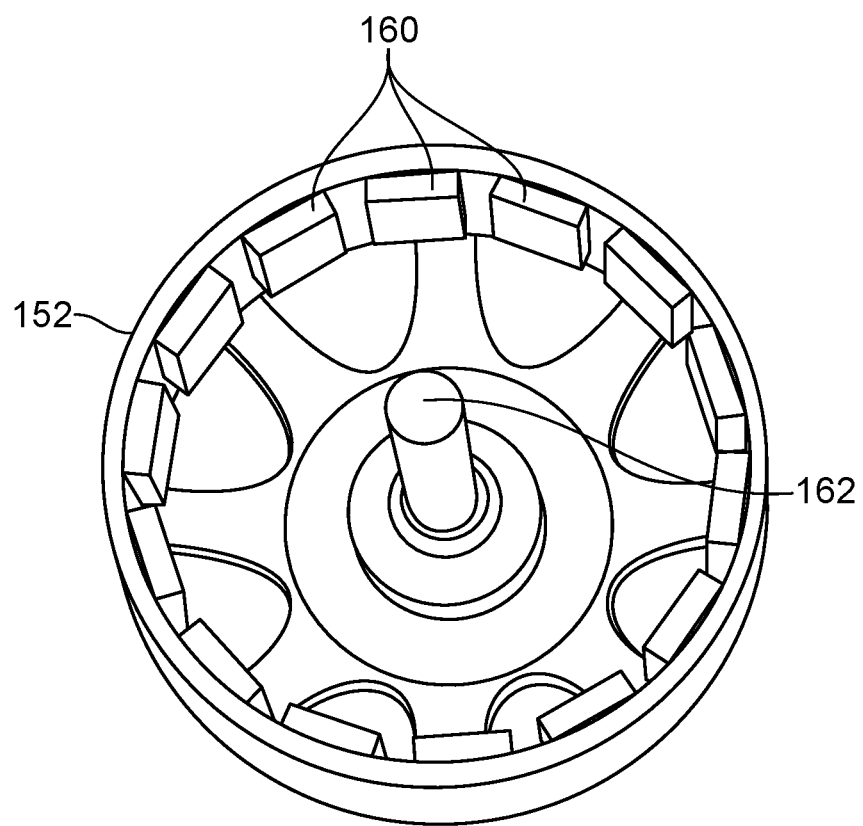
FIG. 13 shows a top view of a hub or rotor component of FIGS. 11-12 with a plurality of magnets on the inside wall of the hub or rotor of the electric power generating apparatus in another embodiment of the present invention.

Referring to FIGS. 11-13, a generator 148 of the apparatus 100 is disclosed. In one embodiment, the generator 148 is, but not limited to, a brushless generator. In this embodiment, the generator 148 includes a stator 150 and a rotor or hub 152. The stator 150 includes a plurality of conductive windings or coils 154 wrapped around poles containing ferrous material. In one embodiment, the plurality of conductive windings or coils 154 is wrapped around poles composed of stacks of lamination of the stator 150. The poles are composed of ferrous or non-ferrous material. In one embodiment, the poles are laminations; In another embodiment, the poles are made of a solid material. In another embodiment the poles are made of hollow material. In one embodiment, the number of poles of the stator 150 is ranging from about, but not limited to, 12 to 36 poles. In one embodiment, a bearing 156 is securely positioned at the center of the stator 150. In one embodiment, the hub 152 contains a plurality of magnets 160 and a shaft 162. In one embodiment the stator 150 is surrounded by the hub 152 and the plurality of magnets 160 and the plurality of magnets 160 is positioned to surround and rotate around the plurality of conductive windings or coils 154 of the stator 150. The hub 152 along with its magnets 160 are rotated when the plurality of protrusions 110 are depressed/moved into the platform 100 by the weight of the passing/moving/stopped overhead object's and/or vehicle's tires 142 over the platform 100 via a push force to rotation force conversion system 104. An electric current is generated within the plurality of insulated conductive windings or coils 154 of the stator 150 due to a change in the magnetic field between the plurality of magnets 160 and the plurality of conductive windings or coils 154. In another embodiment, each hub 152 of the generator is affixed to bearing(s) for rotating the magnets of each generator 160. In another embodiment, each hub 152 of the generator has incorporated into itself a bearing or bearings for rotating the magnets 160. In one embodiment, the plurality of conductive windings or coils 132 (shown in FIG. 7), 154 could be sandwiched by/between the plurality of magnets 136 (shown in FIG. 7), 160 mounted on both sides of the conductive windings 132, 154. In another embodiment, the plurality of magnets 136, 160 could be sandwiched by the plurality of conductive windings or coils 132, 154.

In another embodiment, the conductor coils 132, 154 can surround a plurality of magnets 136, 160 in a plurality of generators. Either the conductor coils 132, 154 or the magnets 136, 160 can rotate around the other to create an electric current. The force to rotate the magnets 136, 160 and/or conductor coils 132, 154 or both are the weight of passing/moving/stopped overhead objects or vehicle tires 142 that are on the top of the platform 100.

Figure 14:
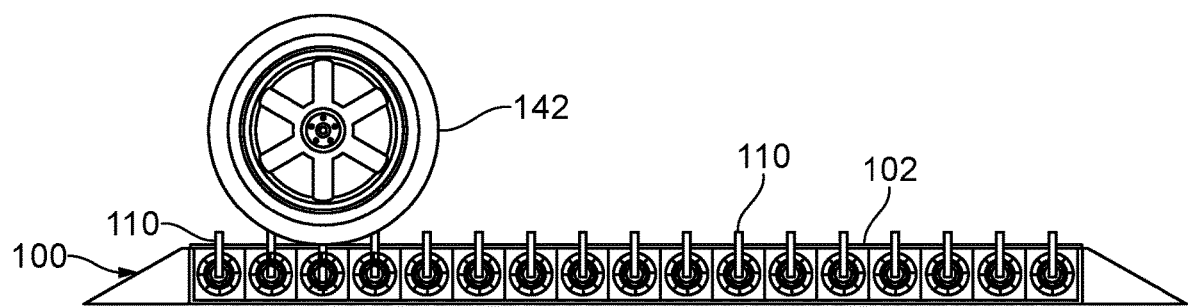
FIG. 14 shows a side cutaway view of a vehicle's tire as it passes or rolls over and/or onto the plurality of protrusions and depresses/moves them through apertures into the platform of the electric power generating apparatus in one embodiment of the present invention.

Referring to FIG. 14, a vehicle's tire 142 passing or rolling or stopped over a plurality of protrusions 110 is disclosed. One or more protrusions 110 is depressed/moved into the platform 100 via/through the plurality of apertures 108 when the vehicle's tire 142 rolls/passes over/stops over the protrusions 110 which were in their initial positions extended up above the top portion of the platform cover 102 of the platform 100. The downward pressing energy of the object's and/or vehicle's tire(s) 142 activates the push force to rotation force conversion system 104 and transfers that force to rotate a shaft 114 and the contents of a plurality of generators (shown in FIGS. 7, 8, 10-13) which are affixed to the shaft, within the platform 100. In one embodiment, the plurality of protrusions 110 is further configured to return to its/their normal or initial position after the vehicle's tire 142 passes over the said protrusions 110. The reset member 120 (shown in FIG. 6) is configured to force the protrusion 110 to return their initial or normal position. When the next tire of any vehicle rolls overhead, the protrusion(s) 110 are depressed/moved again into the platform 100, and if the components of the generator(s) (shown in FIGS. 7, 8, 10-13) are already rotating, then the passing tire 142 will accelerate the rotation of the components of the generator(s) (shown in FIG. 7, 8, 10-13). Neither the movement of the protrusions 110 or the movement of the push force to rotation force conversion system 104 will hinder and/or the rotation of the components of the generator 106 and 148 when the primary protrusion 118 retracts to its starting/re-set position. The protrusions (110 and 118) protruding above the platform top cover/plane 102 are of a height and width that will not impede a smooth ride for passengers inside the vehicles traveling over the platforms 100, and will not slow down the velocity of the vehicles 116 by any meaningful speed. In one embodiment, the protrusions (110 and 118), protruding above the platform covers 102 are designed so as not to be ensnared and damaged by passing the vehicle tires 142 or by getting caught in a passing vehicle's tire treads. Although these platforms 100 are optimized for vehicle traffic, the fact is that the weight of passing pedestrian foot traffic can also rotate the magnets 136 and/or insulated conductor coils 132 of generators (shown in FIGS. 7, 8, 10-13). In one embodiment, the platforms 100 could be securely positioned on foot traffic path/sidewalks or elsewhere where people are walking/running in a particular space. In one embodiment, the protrusions (110 and 118) could prove to be a tripping hazard when the platforms 100 are positioned on foot traffic path/sidewalks, or other walking/running areas. Thus, the protrusions (110 and 118) should be covered with an extra protecting cover, so that passing foot traffic still depresses/moves the protrusions (110 and 118) for generating electric power using the generators (shown in FIGS. 7, 8, 10-13) and the push force to rotation force conversion systems 104 of the platform 100. In one embodiment, the protrusions (110 and 118) are covered so that when people walk/run on the protrusions in such area, but not limited to foot traffic path/sidewalks, their path is made smooth and/or even and thus prevents tripping/stumbling.

Figure 15:
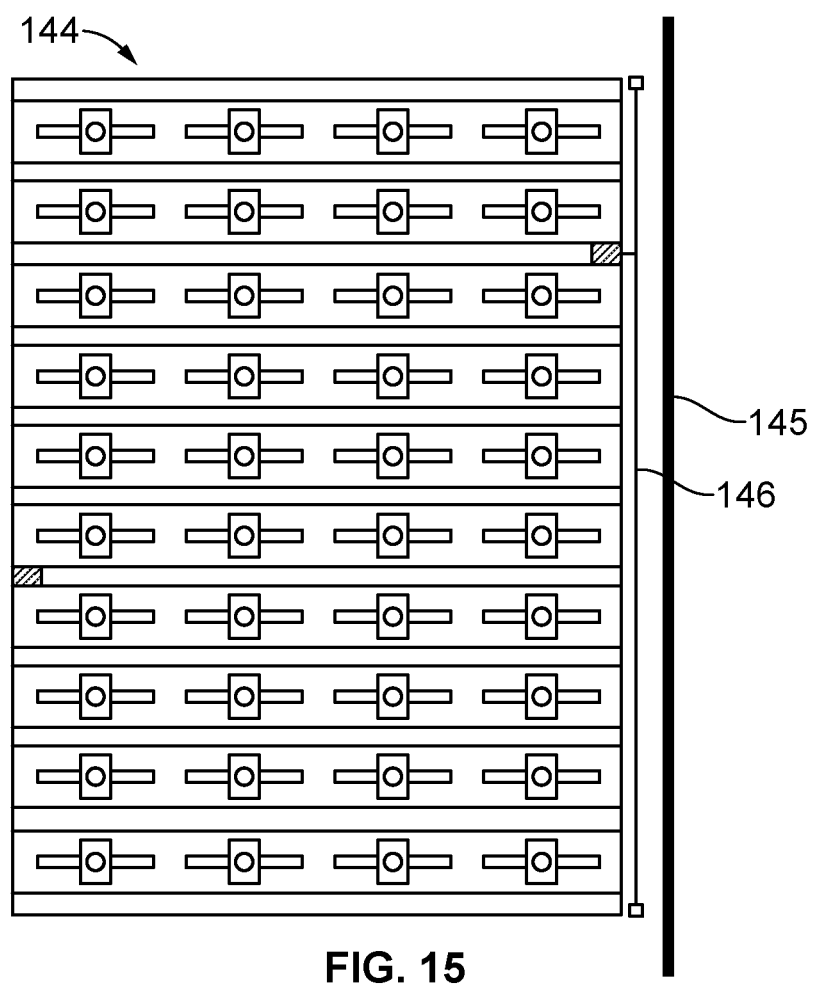
FIG. 15 shows the underside view of a protective cover of the platform including a plurality of protrusion connectors, and the underside of fixtures holding the reset member and through which the main protrusions pass through in one embodiment of the present invention.

Referring to FIG. 15, the underside 144 of a protective cover 102 of the platform 100 is disclosed. In one embodiment, the platform 100 further comprises a protective cover 102. In one embodiment, the protective cover 102 is configured to protect the 'push force to rotation force conversion systems 104, the generators (shown in FIGS. 7, 8, 10-13), and other contents inside the platform 100. In one embodiment the protective cover 102 is comprised of a non-slip surface. In one embodiment, the protective cover 102 is positioned on the platform 100 and sealed to keep moisture outside of the platform 100. In one embodiment the protective cover 102 could be opened and/or closed for easy access to the platform contents. In another embodiment, the protective cover 102 is not opened and/or closed for easy access to the platform 100 and the contents. In one embodiment the protective cover 102 is removable.

In one embodiment, the underside 144 of the protective cover 102 is provided with one or more resistive conductors 146 for melting ice and/or snow to prevent them from accumulating on the platform 100. In one embodiment, the resistive conductors 146 are affixed or integrated into, but not limited to, a top portion of the protective cover 102. In some embodiments, the resistive conductors 146 are affixed or integrated to, but not limited to, an underside 144 of the protective cover 102. In one embodiment, the resistive conductors 146 heat up on the flow of electric current to melt the snow and/or ice that would otherwise accumulate on the platform 100. In an exemplary embodiment, the resistive conductors 146 could be connected to, but are not limited to, insulated electric conductor(s) in order to provide electric current to the resistive conductors 146 of the protective cover 102. In another embodiment, the resistive conductors 146 are affixed to the top portion of the protective cover 102 and/or embedded inside the top protective cover 102. In one embodiment, one or more conductors 145 are used to transfer/transport current outside the platforms 100 to the electric power grid or the power storage unit(s).

Figure 16:
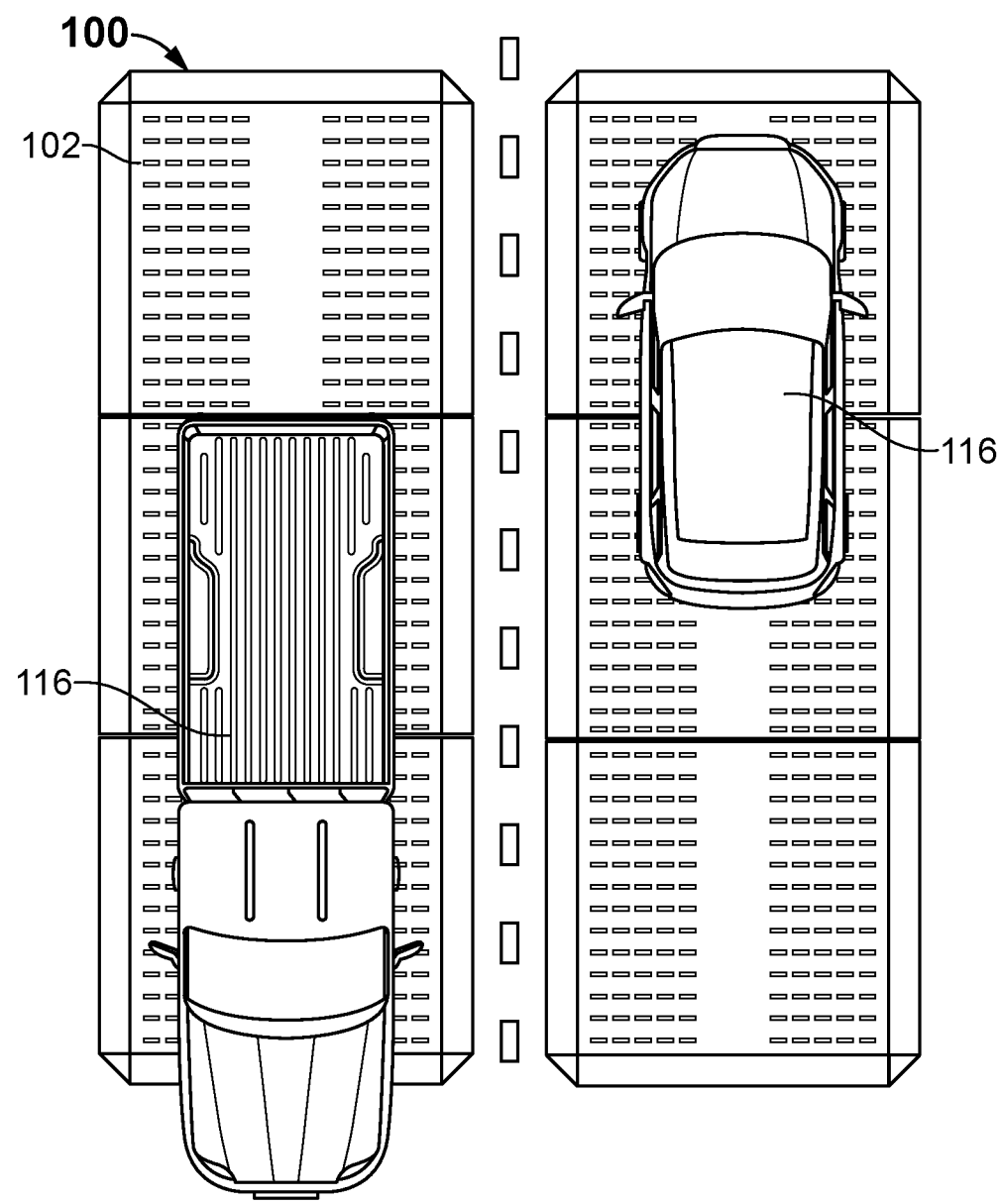
FIG. 16 shows a top view of the platforms with protrusions, and the platforms positioned on a surface, for example, a roadway in one embodiment of the present invention.

Referring to FIG. 16, the platforms 100 of the apparatus are positioned across the surface, for example, but not limited to, roadways and highways are disclosed. In an exemplary embodiment, the platforms 100 could cover the entire width of a roadway. In one embodiment in cold weather climates, the platforms 100 keep the roadway free from ice and snow, when that precipitation occurs. The resistive conductors 146 melt the ice and/or snow to prevent them from accumulating on the platform 100. In another embodiment, the plurality of protrusions 110, the push force to rotation force conversion systems 104, and the generators (shown in FIGS. 7, 8, 10-13) are positioned at pre-determined desired or selected areas within the platforms 100. The position of the plurality of protrusions 110, the push force to rotation force conversion systems 104, and the generators (shown in FIGS. 7, 8, 10-13) within the platform 100 can depend on where the vehicle's tires 142 or where other objects are likely to pass over the top portion of the platform cover 102 of the platforms 100. In one embodiment, the platform 100 does not need to have generators (shown in FIGS. 7, 8, 10-13) situated in locations that cannot harness the force of passing vehicle's tires 142 or other objects. In a preferred embodiment, it would be efficient to also exclude the protrusions 110 and/or apertures from areas in the top portion of the platform cover 102 of the platform 100 where the overhead vehicle tires 142 or other objects will not depress/move them because the vehicle tires 142 or other objects will not be passing overhead in those areas. In one embodiment, a shim or shims are used to level the platform(s) 100 and/or components affixed to the platform(s) 100.

Figure 17:
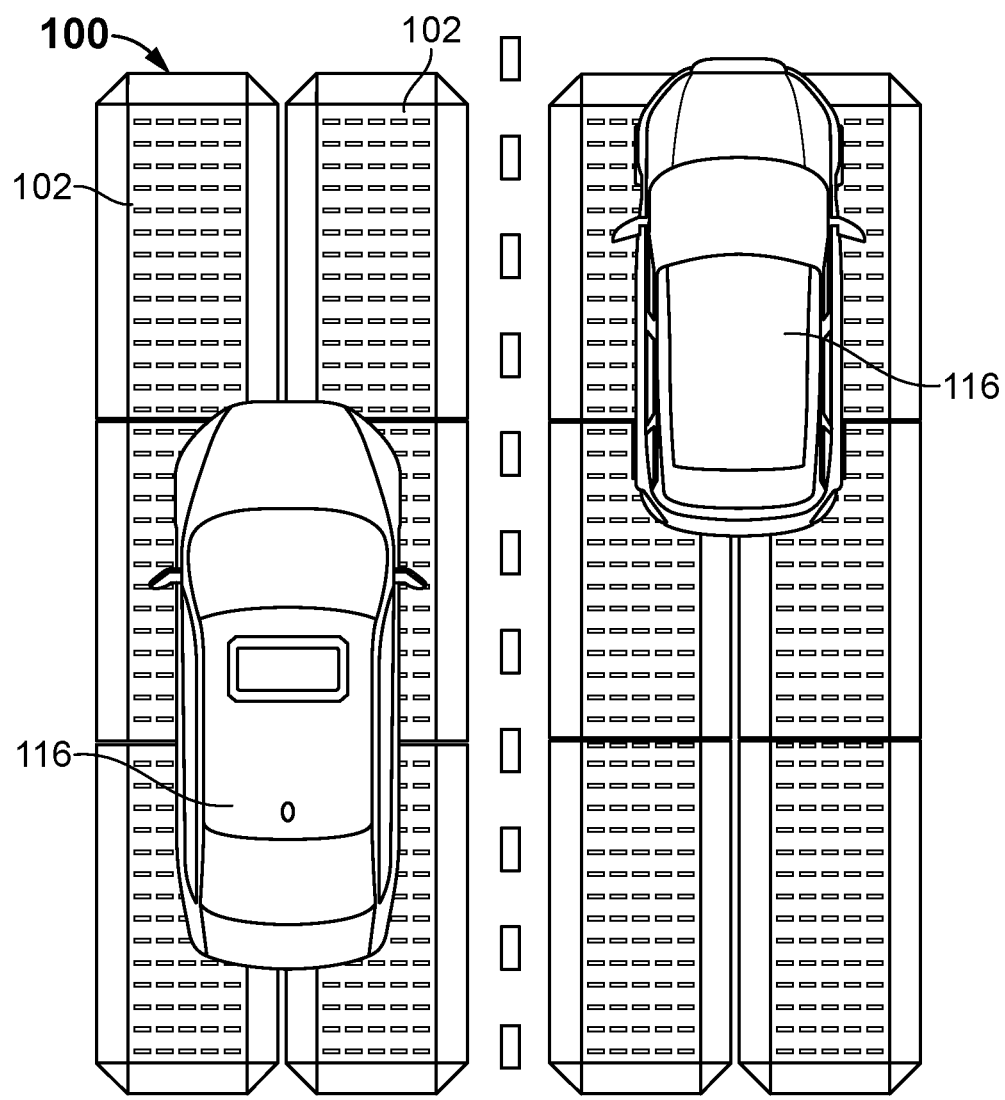
FIG. 17 shows a top view of two parallel platforms with protrusions, and the platforms are placed in a sectional configuration and positioned on a surface, for example, a roadway in another embodiment of the present invention.

Referring to FIG. 17, two parallel platforms 100 in a sectional configuration positioned on the surface, for example, but not limited to, roadways and highways are disclosed. In an exemplary embodiment, the platforms 100 are located on the roadways in the sectional configuration relative to where the vehicle's tires 142 are likely to pass over the top portion of the platform cover 102 of the platform 100. In one embodiment, the electric current generated by one platform 100 is electrically connected to one or more other platforms 100 via insulated and waterproofed electrical conductor(s) to transfer the generated electrical current to an electric distributing network, for example, the power grid. In one embodiment, the electric current generated by the generators 106 within at least one platform 100 is connected to the electric distributing network, for example, the power grid, via one or more insulated and waterproofed electrical conductor(s).

The apparatus/platform 100 efficiently generates electrical power from the weight of moving/passing/stopped objects and/or vehicles 116 and does so with negligible environmental impact and negligible impact to existing object and/or vehicle motion. The plurality of generators 106 are generators of similar or various sizes. Each platform 100 can contain one or more generators. All of those generators 106 could be wired together either directly or indirectly inside the platform 100. The platform 100 is simply installed on the surfaces, for example, highways and roadways. The platforms 100 are cost-effective and simple power generating apparatus for generating and supplying electricity. In cold weather regions, the platforms 100 could contain an additional feature to prevent snow and ice from accumulating on the platforms and on the surfaces; that will reduce the damage to roadways, highways, bridges, etc. and to the environment that is currently caused when snow and ice is removed by snow plows, road salts, and/or de-icing chemicals. The platforms 100 are simply and securely installed on a top surface, for example, the surface of existing roadways and highways, for additional safety and security so that they are not disturbed by extreme weather, tornadoes, floods, and other known perils.

The power generating apparatus/platform 100 protects the surface or layer, for example, highways and roadways, on which they are placed. This will extend the life span of surfaces, for example, highways and roadways; which means the maintenance and replacement costs of said highways and roadways are significantly deferred. An additional benefit of this invention is that any pre-damaged surfaces, such as but not limited to, surfaces with potholes and/or significant cracks, will no longer be encountered by vehicles 116 or objects, because they will instead move along a level solid surface that these platforms 100 provide, and thus encounter a much smoother and safer travel experience.

The platform 100 efficiently generates electrical power from moving vehicles 116 or other objects with negligible environmental pollution. The platforms 100 are cost-effective solutions for generating and supplying green electricity. The platforms 100 could also prevent snow and ice accumulation on the surfaces and also reduce damages to roadways, highways, and bridges, etc. caused by the removal of snow and ice.

Although one or more embodiments of the invention has been illustrated in the accompanying drawings and described in the above detailed description, it will be understood that the invention is not limited to the embodiments developed herein, but is capable of numerous rearrangements, modifications, substitutions of parts and elements without departing from the spirit and scope of the invention.

The foregoing description comprises illustrative embodiments of the present invention. Having thus described exemplary embodiments of the present invention, it should be noted by those skilled in the art, that the disclosures made within are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. An electrical generating apparatus, comprising:
a raised platform positioned on a surface that an object traverses, the platform including a cavity configured to receive at least one protrusion, at least one shaft, and at least one generator, wherein the at least one protrusion, the at least one shaft, and the at least one generator are operably connected to each other;
the platform having an elongated top portion which includes at least one aperture formed in the top portion;
wherein the at least one protrusion is configured to move through the at least one aperture and extend above the top portion in an initial state of the at least one protrusion, and the at least one protrusion is contained within the at least one aperture in a secondary state, the at least one protrusion positioned to fill the at least one aperture relative to the top portion when in the secondary state such that no indentation remains in the top portion when the at least one protrusion is moved from the initial state to the secondary state;
a reset member configured to move the at least one protrusion between the initial state and the secondary state;
a first subset including the at least one protrusion, the at least one shaft, and the at least one generator, and further comprising a first plurality of protrusions, a first plurality of shafts, and a first plurality of generators;
a second subset including the at least one protrusion, the at least one shaft, and the at least one generator, and further comprising a second plurality of protrusions, a second plurality of shafts, and a second plurality of generators,
wherein the at least one aperture further comprises a plurality of apertures, and each respective protrusion of the first and second plurality of protrusions is associated with a respective aperture of the plurality of apertures,
a push force to rotation force conversion system translating a push force applied to the first subset of the first plurality of protrusions to a rotational force applied to the first plurality of shafts and the first plurality of generators, and translating a push force applied to the second subset of the second plurality of protrusions to a rotational force applied to the second plurality of shafts and the second plurality of generators;
wherein the push force to rotation force conversion system is configured to convert weight or force of the object that rotationally contacts the top portion, and when the rotational weight or force of the object moves over the top portion and the object contacts a portion of the first and/or second plurality of protrusions of the first and/or second subset, respectively, positioned in the top portion, only the portion of the first and/or second plurality of protrusions contacted moves, and the object is not moved away from the top portion of the platform by contact with the portion of the first and/or second plurality of protrusions, wherein the first subset and the second subset are spaced apart from each other such that the top portion includes an inactive area without electrical generation therefrom, the inactive area formed without any of the first and second plurality of protrusions of the first and second subsets, respectively, and the inactive area positioned between the first subset and the second subset, such that the first subset, the inactive area, and the second subset are positioned in an axial alignment relative to each other and relative to an axial alignment of the elongated top portion of the platform which is positioned on the surface comprising a lane of a roadway, the at least one object moving over at least one of the first subset, the second subset, and the inactive area.

2. The apparatus of claim 1, wherein the first and second plurality of generators are rotating generators, and each rotating generator includes at least one permanent magnet and forms one or more electrical generating assemblies, and each electrical generating assembly is operably connected to at least one conductor to transfer electrical current produced from each electrical generating assembly.

3. The apparatus of claim 2, wherein an electric current created by the plurality of rotating generators is at least partially transferred to an electric power grid or power storage unit(s) via one or more conductors that are adequate, insulated, and/or waterproofed.

4. The apparatus of claim 1, wherein the at least one object comprises a air of tires of a vehicle, the pair of tires positioned in a transverse alignment relative to the axial alignment of the top portion of the platform as well as the axial alignment of the first and second subsets and the inactive area therebetween, such that one tire of the pair of tires contacts one portion of the first plurality of protrusions of the first subset and the other tire of the pair of tires contacts another portion of the second plurality of protrusions of the second subset simultaneously when the pair of tires are positioned to traverse over the platform providing a section of the lane of the roadway.

5. The apparatus of claim 1, further comprising at least one diode that allows current to flow toward a power grid and/or power storage unit(s) while resisting and preventing the current from flowing back toward one or more of the plurality of generators.

6. The apparatus of claim 1, wherein an exterior of the platform is colored and/or coated with a color or colors to reflect or absorb wavelengths of sunlight in order to reflect heat away from the platform and/or its contents or to absorb heat to warm the platform and/or its contents, and further comprising one or mom heating items configured to heat the top surface of the platform.

7. The apparatus of claim 1, wherein each shaft of the first and second plurality of shafts, respectively includes at least one generator from the first and second plurality of generators, respectively.

8. The apparatus of claim 2, wherein the one or more electrical generating elements include a first circumferential array of one of a plurality of permanent magnets and a plurality of insulated conductor coils, and the second circumferential array includes the other of the plurality of permanent magnets and the plurality of insulated conductor coils.

9. The apparatus of claim 8, wherein the first circumferential array is positioned a) radially outside of the second circumferential array or b) radially inside of the second circumferential array.

10. The apparatus of claim 1, wherein the first subset of the plurality of protrusions and the second subset of the plurality of protrusions each comprise at least two protrusions.

11. The apparatus of claim 1, further comprising a plurality of platforms, each of the plurality of platforms comprising two or more rotating shafts, two or more generators, and four or more protrusions.

12. The apparatus of claim 1, wherein at least a portion of the first and/or second plurality of generators of the first and/or second subsets, respectively, generate alternating current.

13. The apparatus of claim 1, further comprising at least one power storage unit which receives current from at least a portion of one of the first and second plurality of generators.

14. The apparatus of claim 11, wherein the current generated by the electrical generating elements is converted into alternating current using one or more power inverters.

15. An electrical power generating apparatus, comprising:
a raised platform positioned on a surface that an object traverses, the platform including a cavity configured to receive at least one protrusion, at least one rotating shaft, and at least one generator wherein the at last one protrusion, the at least one shaft, and the at least one generator are operatively connected;
the platform having an elongated top portion which includes at least one aperture;
wherein the at east one protrusion is configured to move through the at least one aperture and extend above the top portion in an initial state of the at least one protrusion, and the at least one protrusion is contained within the at least one aperture in a secondary state, such that the at least one protrusion is positioned to fill the at least one aperture relative to the top portion in the secondary state such that no indentation remains in the top portion when the at least one protrusion is moved from the initial state to the secondary state;
a reset member configured to move the at least one protrusion between the initial state and the secondary state;
a first subset including the at least one protrusion, the at least one shaft, and the at least one generator, and further comprising a first plurality of protrusions, a first plurality of shafts, and a first plurality of generators;
a second subset including the at least one protrusion, the at least one shaft, and the at least one generator, and further comprising a second plurality of protrusions, a second plurality of shafts, and a second plurality of generators,
wherein the at least one aperture comprises a plurality of apertures, and each respective protrusion of the first and second plurality of protrusions is associated with a respective aperture of the plurality of apertures,
a push force to rotation force conversion system translating a push force applied to the first subset of the first plurality of protrusions to a rotational force applied to the first plurality of rotating shafts and the first plurality of generators, and translating a push force applied to the second subset of the plurality of protrusions to a rotational force applied to the second plurality of rotating shafts and the second plurality of generators, wherein in the first subset, at least one respective generator of the first plurality of generators is mounted to and positioned around one respective rotating shaft of the plurality of first rotating shafts, and in the second subset, at least one respective generator of the second plurality of generators is mounted to and positioned around one respective rotating shaft of the second plurality of rotating shafts, the first and second plurality of rotating shafts causing rotation of one or more electrical generating elements of the first and second plurality of generators, wherein the one or more electrical generating elements include a first circumferential array including one of a plurality of permanent magnets and a plurality of insulated coils and a second circumferential array includes the other of the plurality of permanent magnets and the plurality of insulated conductor coils, such that the first circumferential array is positioned a) radially outside of the second circumferential array or b) radially inside of the second circumferential array, wherein the movement or rotation of the first and/or second plurality of generators requires downward movement of a portion of the respective first and/or second plurality of protrusions through a portion of an associated respective plurality of apertures, wherein the push force to rotation force conversion system is configured to convert weight or force of at least one object that rotationally contacts the top portion, and when the rotational weight or force of the at least one object moves over the top portion and contacts the portion of the first and/or second plurality of protrusions of the first and/or second subsets, respectively, only the portion of the first and/or second plurality of protrusions contacted moves, and the at least one object is not moved away from the top portion of the platform by contact with the portion of the first and/or second plurality of protrusions, wherein the first subset and the second subset are spaced apart relative to each other such that the top portion includes an inactive area, and the inactive area is positioned between the first subset and the second subset, such that the first subset, the inactive area, and the second subset are positioned in an axial alignment relative to each other and relative to an axial alignment of the elongated top portion of the platform which is positioned on the surface comprising a lane of a roadway, the at least one object moving over at least one of the first subset, the second subset, and the inactive area.

16. The apparatus of claim 15, wherein at least a portion of the first and second plurality of generators include a plurality of bearings directly mounted to at least a portion of the first and second plurality of rotating shafts.

17. The apparatus of claim 15, wherein the at least one object comprises a pair of tires of a vehicle, the pair of tires positioned in a transverse alignment relative to the axial alignment of the platform, the first and second subsets, and the inactive area therebetween, such that one tire of the pair of tires contacts at least one portion of the first plurality of protrusions of the first subset and the other tire of the pair of tires contacts the other portion of the second plurality of protrusions of the second subset simultaneously when the pair of tires are positioned to traverse over the platform providing a section of the lane of the roadway.

18. The apparatus of claim 15, wherein each rotating shaft of the respective first and second plurality of rotating shafts includes at least one generator from the respective first and second plurality of generators.

19. The apparatus of claim 15, further comprising at least one diode that allows current to flow toward a power grid and/or power storage unit(s) while resisting and preventing the current from flowing back toward one or more of the plurality of generators.

20. An electrical power generating apparatus, comprising:
a raised platform positioned on a surface that an object traverses, the platform including a cavity configured to receive at least one protrusion, at least one rotating shaft, and at least one generator, the at least one protrusion, the at least one rotating shaft, and the at least one generator being operatively connected to each other;

the platform having an elongated top portion which includes at least one aperture formed in the top portion;

wherein the at least one protrusion is configured to move through the at least one aperture and extend above the top portion in an initial state of the at least one protrusion, and the at least one protrusion is contained within the at least one aperture when in a secondary state, such that the at least one protrusion is positioned to fill the at least one aperture relative to the top portion in the secondary state such that no indentation remains in the top portion when the at least one protrusion is moved from the initial state to the secondary state;

a reset member configured to move the at least one protrusion between the initial state and the secondary state;

at least one subset includes the at least one protrusion, the at least one shaft, and the at least one generator, and further comprises a plurality of protrusions, a plurality of rotating shafts, and a plurality of generators, wherein the at least one aperture composes a plurality of apertures, and each respective protrusion of the plurality of protrusions is associated with a respective aperture of the plurality of apertures, a push force to rotation force conversion system translating a push force applied to the plurality of protrusions of the at least one subset to a rotational force applied to the plurality of rotating shafts of the at least one subset and the plurality of generators of the at least one subset;

wherein in the at least one subset, at least one respective generator of the plurality of generators is mounted to and positioned around one respective rotating shaft of the plurality of rotating shafts, the plurality of rotating shafts causing rotation of one or more electrical generating elements of the plurality of generators, wherein the rotation of the plurality of generators requires downward movement of a respective portion of protrusions of the plurality of protrusions through respective apertures of the plurality of apertures from the initial position to the secondary position, wherein the push force to rotation force conversion system is configured to convert weight or force of at least one object that rotationally contacts the top portion, and when the rotational weight or force of the at least one object moves over the top portion and contacts at least a portion of the plurality of protrusions of the at least one subset, only the portion of the plurality of protrusions contacted moves, and the at least one object is not moved away from the top portion of the platform by contact with the portion of the plurality of protrusions, and wherein the top portion includes an inactive area positioned next to the at least one subset, such that the at least one subset and the inactive area are positioned side-by-side in an axial alignment relative to each other and relative to an axial alignment of the elongated top portion of the platform that is positioned on the surface comprising at least one lane of a roadway, wherein the at least one object comprises a vehicle having at least one pair of spaced-apart tires positioned transversely relative to a chassis of the vehicle positioned therebetween, t feast one tire of the at least one pair of spaced-apart tires moving over the at least one subset and the chassis positioned over at least a portion of the inactive area.

* * * * *